US012063247B1

(12) United States Patent
Schwarz, Jr. et al.

(10) Patent No.: US 12,063,247 B1
(45) Date of Patent: Aug. 13, 2024

(54) INTENT-BASED ANTI-PHISHING MANAGEMENT SYSTEMS AND METHODS

(71) Applicant: United Services Automobile Association (USAA), San Antonio, TX (US)

(72) Inventors: Thomas Wayne Schwarz, Jr., Helotes, TX (US); Sean Carl Mitchem, San Antonio, TX (US); Timothy Blair Chalmers, San Antonio, TX (US); Robert Lee Black, San Antonio, TX (US); Gideon Bowie Luck, Wylie, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 214 days.

(21) Appl. No.: 17/362,715

(22) Filed: Jun. 29, 2021

Related U.S. Application Data

(60) Provisional application No. 63/046,166, filed on Jun. 30, 2020.

(51) Int. Cl.
| | |
|---|---|
| *H04L 9/40* | (2022.01) |
| *G06F 9/445* | (2018.01) |
| *G06F 21/53* | (2013.01) |
| *G06N 5/02* | (2023.01) |
| *H04L 67/1097* | (2022.01) |

(52) U.S. Cl.
CPC ...... *H04L 63/1483* (2013.01); *G06F 9/44526* (2013.01); *G06F 21/53* (2013.01); *G06N 5/02* (2013.01); *G06F 2221/033* (2013.01); *H04L 67/1097* (2013.01)

(58) Field of Classification Search
CPC ............ H04L 63/1483; H04L 67/1097; G06F 9/44526; G06F 21/53; G06F 2221/033; G06N 5/02
See application file for complete search history.

(56) References Cited

U.S. PATENT DOCUMENTS 10,834,128 B1 * 11/2020 Rajagopalan ......... H04L 51/212
10,999,322 B1 *  5/2021 Yuan ..................... G06F 16/583
(Continued)

*Primary Examiner* — Trong H Nguyen
(74) *Attorney, Agent, or Firm* — Fletcher Yoder P.C.

(57) ABSTRACT

Embodiments are described herein relating to systems and methods for blocking access to phishing-related content accessible via links that are presented via applications being executed on electronic devices based at least in part on implied intent on the part of users using the electronic devices. For example, anti-phishing software may be configured to detect selection of potential phishing-related links that are presented via the applications being executed on the electronic devices, to determine authenticity of the potential phishing-related links, and to take appropriate action based on the authenticity of the potential phishing-related links. For example, the anti-phishing software may be configured to analyze content associated with the potential phishing-related links (e.g., to estimate user intent) and/or to access potential phishing-related content at locations corresponding to the potential phishing-related links (e.g., in an isolated sandbox mode) to determine whether to block or allow access to the potential phishing-related content based on the authenticity of the potential phishing-related links.

16 Claims, 5 Drawing Sheets

(56) References Cited

U.S. PATENT DOCUMENTS

| | | | |
|---|---|---|---|
| 2007/0136806 A1* | 6/2007 | Berman | G06Q 10/107 |
| | | | 726/22 |
| 2009/0077383 A1* | 3/2009 | de Monseignat | H04L 9/3242 |
| | | | 713/176 |
| 2010/0332593 A1* | 12/2010 | Barash | H04L 63/145 |
| | | | 709/203 |
| 2014/0298460 A1* | 10/2014 | Xue | H04L 63/1425 |
| | | | 726/23 |
| 2018/0115584 A1* | 4/2018 | Alhumaisan | H04L 63/1483 |
| 2018/0183820 A1* | 6/2018 | Iyer | H04L 63/1483 |

* cited by examiner

INTENT-BASED ANTI-PHISHING MANAGEMENT SYSTEMS AND METHODS

CROSS-REFERENCE TO RELATED APPLICATION

The present application claims benefit of and priority to U.S. Provisional Patent Application Ser. No. 63/046,166, titled "Intent-Based Anti-Phishing Management Systems and Methods," which was filed on Jun. 30, 2020, and which is herein incorporated by reference in its entirety for all purposes.

BACKGROUND

The present disclosure relates generally to systems and methods for blocking access to phishing-related content accessible via links that are presented via applications being executed on electronic devices based at least in part on implied intent on the part of users using the electronic devices.

Phishing may be defined as the use of electronic communications (e.g., email, text, social media, and so forth) to obtain unauthorized access to data. Many people are not tech savvy and are susceptible to this kind of malicious activity. Phishing is partly enabled by browsers not being able to prevent users from accessing websites that seem to have been selected by the users. Thus, the users end up on websites that look like official websites but that are actually fake and designed to obtain confidential data in an unauthorized manner.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Embodiments of the present disclosure include systems and methods for blocking access to phishing-related content accessible via links that are presented via applications being executed on electronic devices based at least in part on implied intent on the part of users using the electronic devices. For example, anti-phishing software may be configured to detect selection of potential phishing-related links that are presented via the applications being executed on the electronic devices, to determine authenticity of the potential phishing-related links, and to take appropriate action based on the authenticity of the potential phishing-related links. For example, the anti-phishing software may be configured to analyze content associated with the potential phishing-related links (e.g., to estimate user intent) and/or to access potential phishing-related content at locations corresponding to the potential phishing-related links (e.g., in an isolated sandbox mode) to determine whether to block or allow access to the potential phishing-related content based on the authenticity of the potential phishing-related links.

In certain embodiments, a method includes detecting, via anti-phishing software executed by at least one processor of an electronic device, selection of a link presented via an application executed by the at least one processor. The method also includes analyzing, via the anti-phishing software, content of the application associated with the link to determine authenticity of the link based at least in part on an implied intent relating to the selection of the link in a context of the content of the application. The method further includes communicating, via the anti-phishing software, a command signal relating to the authenticity of the link to the application.

In addition, in certain embodiments, a tangible, non-transitory machine-readable medium, includes processor-executable instructions that, when executed by at least one processor, cause the at least one processor to implement anti-phishing software. The anti-phishing software is configured to detect selection of a link presented via an application executed by the at least one processor. The anti-phishing software is also configured to analyze content of the application associated with the link to determine authenticity of the link based at least in part on an implied intent relating to the selection of the link in a context of the content of the application. The anti-phishing software is further configured to communicate a command signal relating to the authenticity of the link to the application.

In addition in certain embodiments, an anti-phishing system is configured to detect, via anti-phishing software executed by at least one processor of an electronic device, selection of a link presented via an application executed by the at least one processor; to analyze, via the anti-phishing software, content of the application associated with the link to determine authenticity of the link based at least in part on an implied intent relating to the selection of the link in a context of the content of the application; and to communicate, via the anti-phishing software, a command signal relating to the authenticity of the link to the application.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
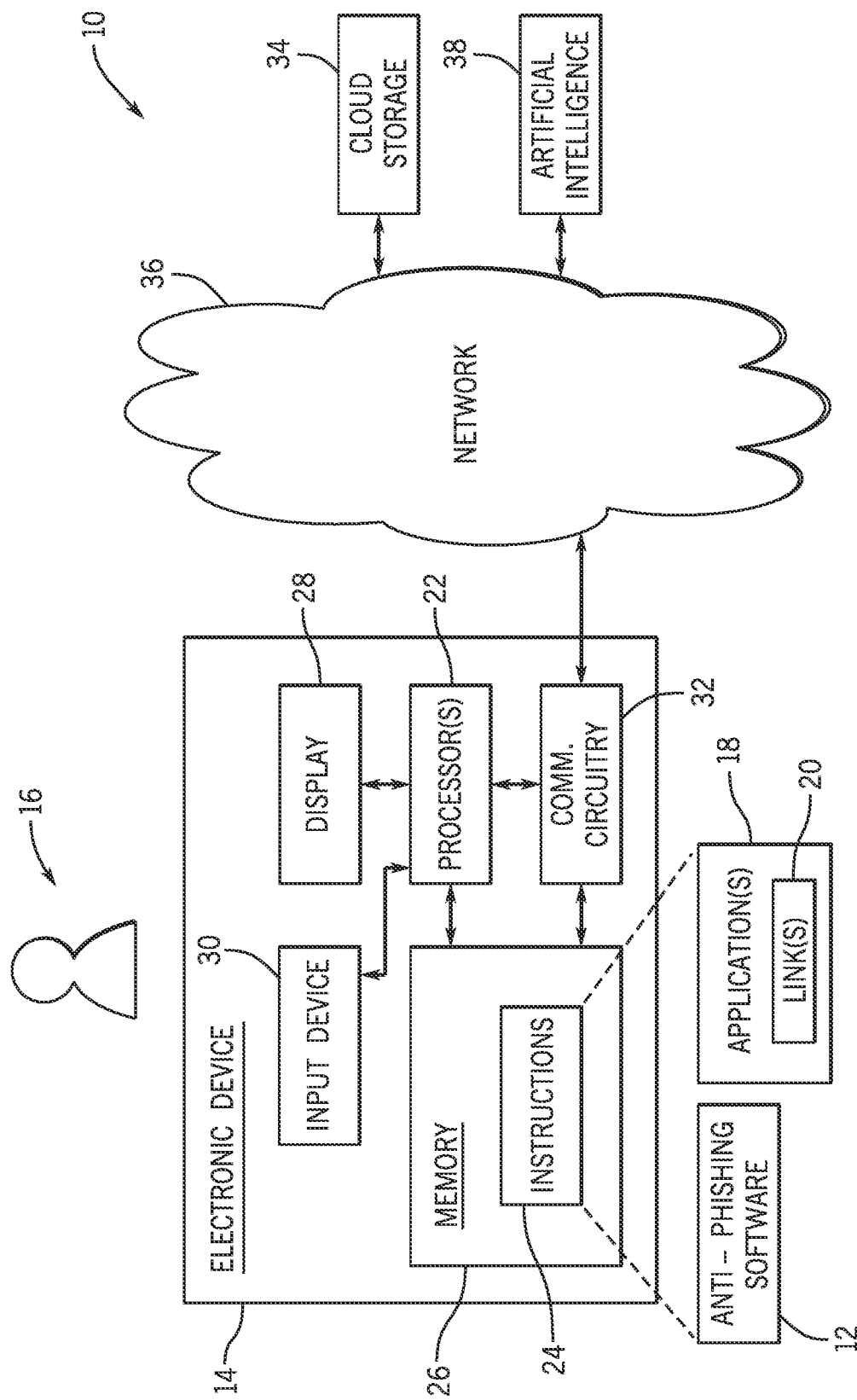
FIG. 1 is a schematic diagram of an anti-phishing system that includes anti-phishing software configured to continuously monitor user activity of an electronic device and to block interaction with phishing attempts that are encountered by a user while using one or more applications being executed on the electronic device, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In the following description, for the purposes of explanation, numerous specific details are set forth in order to provide a thorough understanding of embodiments of the present disclosure. It will be apparent, however, to one skilled in the art that embodiments of the present disclosure may be practiced without some of these specific details.

As used herein, terms "continuous" and "continuously" may refer to ongoing (e.g., iterative) actions that are performed without interruption or are performed with interruptions that take no longer than a relatively short period of time, such as no longer than a 5-second interruption between the ongoing actions, no longer than a 1-second interruption between the ongoing actions, and so forth. For example, continuous ongoing actions may be performed in an iterative manner such that there is no appreciable (e.g., human-perceivable) interruption of the iterative actions.

As used herein, the terms "automatic" and "automatically" may refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

As used herein, the terms "real time" and "substantially real time" may refer to actions that are performed substantially simultaneously with other actions, without any human-perceptible delay between the actions. For example, two functions performed in substantially real time occur within seconds (or even within milliseconds) of each other. As but one non-limiting example, two functions performed in substantially real time occur within 1 second, within 0.1 second, within 0.01 second, and so forth, of each other.

As used herein, the term "application" may refer to one or more computing modules, programs, processes, workloads, threads, and/or computing instructions executed by a computing system. Example embodiments of an application include software modules, software objects, software instances, and/or other types of executable code.

Various embodiments of the present disclosure generally relate to systems and methods for blocking access to phishing-related content accessible via links that are presented via applications being executed on electronic devices based at least in part on implied intent on the part of users using the electronic devices. For example, anti-phishing software may be configured to detect selection of potential phishing-related links that are presented via the applications being executed on the electronic devices, to determine authenticity of the potential phishing-related links, and to take appropriate action based on the authenticity of the potential phishing-related links. For example, the anti-phishing software may be configured to analyze content associated with the potential phishing-related links (e.g., to estimate user intent) and/or to access potential phishing-related content at locations corresponding to the potential phishing-related links (e.g., in an isolated sandbox mode) to determine whether to block or allow access to the potential phishing-related content based on the authenticity of the potential phishing-related links.

FIG. 1 is a schematic diagram of an anti-phishing system 10 that includes anti-phishing software 12 configured to continuously monitor user activity of an electronic device 14 and to automatically block interaction with phishing attempts that are encountered by a user 16 while using one or more applications 18 being executed on the electronic device 14. For example, as described in greater detail herein, in certain embodiments, the anti-phishing software 12 may be configured to detect when the user 16 has selected a link 20 presented via an application 18 that would, otherwise, cause the application 18 to access content that is configured to gain access to confidential data for the user 16 (e.g., bank data, credit card data, personal identification data, online commerce login data, and so forth) in an unauthorized manner.

In addition, in certain embodiments, in response to detecting that the link 20 has been selected by the user 16, the anti-phishing software 12 may be configured to "sandbox" the link 20, preliminarily loading the content accessed via the link 20 into a sandbox, and evaluating the link 20 and its associated content for authenticity while the content is isolated in the sandbox (e.g., an isolated executable space wherein the content has limited, or even no, access to potentially harmful phishing content, whereby the isolated content may be examined by the anti-phishing software 12 to determine the authenticity of the isolated content). If the anti-phishing software 12 identifies the link 20 as authentic, the anti-phishing software 12 may allow the content accessed via the link 20 to be presented to the user 16 via the application 18, as described in greater detail herein. Conversely, if the anti-phishing software 12 identifies the link 20 as not authentic, the anti-phishing software 12 may shut down the content accessed via the link 20 without it ever leaving the sandbox, as also described in greater detail herein. In certain embodiments, rather than simply shutting down the link 20 and its associated content, the anti-phishing software 12 may route the user 16 to another location via the application 18 (or some other application). As such, by isolating the potentially harmful content in a sandbox, the anti-phishing software 12 ensures that potentially harmful phishing content is not automatically accessed by the user 16 via the application 18.

As illustrated in FIG. 1, in certain embodiments, the electronic device 14 may include one or more processors 22 configured to execute instructions 24 stored in memory media 26 of the electronic device 14, wherein the instructions 24, when executed by the at least one processor 22, enable the anti-phishing system 10 (e.g., the anti-phishing software 12 in conjunction with one or more applications 18 being executed by the at least one processor 22) to perform the anti-phishing functions described in greater detail herein. In particular, the one or more processors 22 may be configured to execute instructions 24 to cause the anti-phishing software 12 and the one or more applications 18 to function on the electronic device 14. For example, the one or more processors 22 may execute certain instructions 24 that cause one or more applications 18 to be displayed via a display 28 (e.g., a light emitting diode (LED) display, an organic LED (OLED) display, and so forth) of the electronic device 14. In addition, as described in greater detail herein, in certain embodiments, the one or more processors 22 may execute certain instructions 24 that cause the anti-phishing software 12 to either run as a plug-in control component within one or more of the applications 18 and/or to run as a background application (e.g., separate from the one or more applications 18) configured to cooperate with the one or more of the applications 18 to detect when potential phishing-related links 20 are selected by a user 16 of the electronic device 14 (e.g., by manipulating one or more inputs devices 30, such as touchscreens, buttons, trackballs, keyboard and mouse, and so forth, of the electronic device 14), and to take action regarding the potential phishing-related links 20, as described in greater detail herein.

In certain embodiments, the one or more processors 22 of the electronic device 14 may be any suitable type of computer processors or microprocessors capable of executing computer-executable code. In certain embodiments, the memory media 26 of the electronic device 14 may be any suitable articles of manufacture that can serve as media to store processor-executable code, data, or the like. These articles of manufacture may represent computer-readable media (e.g., any suitable form of memory or storage) that may store processor-executable code (e.g., the instructions 24) executed by the one or more processors 22 to perform the presently disclosed techniques. In certain embodiments, the memory media 26 of the electronic device 14 may also be used to store data, the anti-phishing software 12, various applications 18, and so forth, as described in greater detail herein. In certain embodiments, the memory media 26 of the electronic device 14 may represent tangible, non-transitory computer-readable media (e.g., any suitable form of memory or storage) that may store the processor-executable code used by the one or more processors 22 to perform various techniques described herein. It should be noted that non-transitory merely indicates that the media is tangible and not a signal. It should be noted that the components described above with regard to the electronic device 14 are exemplary components, and the electronic device 14 may include additional or fewer components in certain embodiments.

In addition, as described in greater detail herein, in certain embodiments, the electronic device 14 may include communication circuitry 32 configured to facilitate communication between the electronic device 14 and external systems (e.g., cloud storage 34, in certain embodiments) via a communication network 36. For example, in certain embodiments, once the anti-phishing software 12 determines that certain links 20 are phishing-related, the anti-phishing software 12 may store information relating to the phishing-related links 20 in the cloud storage 34 via the communication network 36 using the communication circuitry 32 of the electronic device 14. In certain embodiments, the communication circuitry 32 may facilitate communications using Wi-Fi, near field communication, Bluetooth, Zigbee, radio frequency identification (RFID) tags and/or readers, an embedded wireless module, and/or another suitable wired or wireless communication network 36.

In addition, as described in greater detail herein, in certain embodiments, the anti-phishing software 12 may employ artificial intelligence 38 to analyze content associated with the links 20 to determine the authenticity of the links 20. For example, in certain embodiments, the anti-phishing software 12 may be configured to determine an implied intent on the part of the user 16 based at least in part on the content associated with the links 20. In certain embodiments, the anti-phishing software 12 may be aided in this analysis by artificial intelligence 38 that may, for example, be accessed by the anti-phishing software 12 via the communication network 36.

Figure 2:
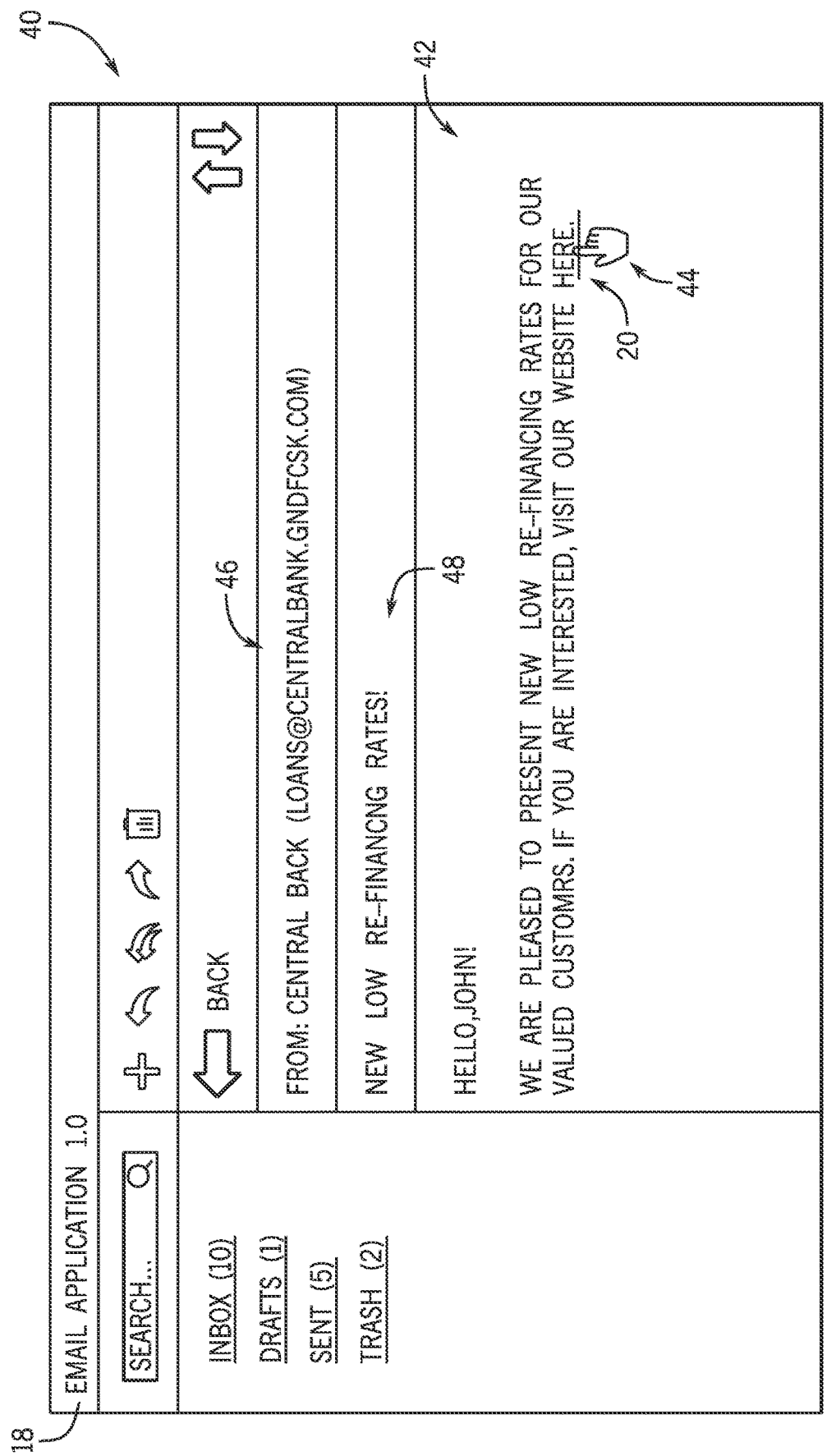
FIG. 2 illustrates a graphical user interface presented on a display of an electronic device for an application being executed on the electronic device, which is presenting a potential phishing-related link, in accordance with embodiments described herein.

FIG. 2 illustrates a graphical user interface 40 presented on a display 28 of an electronic device 14 for an application 18 being executed on the electronic device 14, which is presenting a potential phishing-related link 20. In the illustrated embodiment, the application 18 is an email application that presents email messages 42 that may contain potential phishing-related links 20 embedded therein. However, in other embodiments, the application 18 may instead be a web browser application, a text messaging application, a social media application, or any other application that may present potential phishing-related links 20 to a user 16 of the electronic device 14.

As described in greater detail herein, anti-phishing software 12 that is also being executed on the electronic device 14 may continuously monitor inputs received from one or more input devices 30 of the electronic device 14 to determine when a user 16 has selected the potential phishing-related link 20 (e.g., as illustrated by icon 44), and then may determine authenticity of the potential phishing-related link 20 based at least in part on an implied intent of the user 16 selecting the potential phishing-related link 20 in the context of the rest of the content associated with the potential phishing-related link 20. As described herein, in certain embodiments, the anti-phishing software 12 may be a plug-in control component that is executed within the application 18 or may be a completely separate application that is executed simultaneously with the application 18 (e.g., as a background application, for example, separate from and being executed in parallel with the application 18). Regardless, the anti-phishing software 12 may continuously monitor activity (e.g., selection of potential phishing-related links 20) of inputs received via one or more input devices 30 of the electronic device 14 to ensure that interaction with phishing-related content via the electronic device 14 is minimized.

As described in greater detail herein, in certain embodiments, the implied intent of the user 16 selecting the potential phishing-related link 20 illustrated in FIG. 2 may be determined by the anti-phishing software 12 based at least in part on the context of the rest of the content associated with the potential phishing-related link 20. For example, in the context of the email application 18 illustrated in FIG. 2, other content of the application 18 associated with the potential phishing-related link 20 may include, but is not limited to, the email address 46 from which the email message 42 containing the potential phishing-related link 20 was received, the content of the subject line 48 of the email message 42, other content of the email message 42, and so forth.

For example, in the illustrated embodiment, the email message 42 appears to be notifying the user 16 that new re-financing rates are available at Central Bank. In certain embodiments, the anti-phishing software 12 may determine that the user 16 intended to select the potential phishing-related link 20 for the purpose of accessing more information related to the alleged new re-financing rates based at least in part on the context of the content (e.g., the email message 42) of the application 18 associated with the potential phishing-related link 20 (e.g., the email address 46 from which the email message 42 containing the potential phishing-related link 20 was received, the content of the subject line 48 of the email message 42, other content of the email message 42, and so forth). In certain embodiments, the anti-phishing software 12 may employ artificial intelligence 38 to aid in the analysis of the content of the email message 42 presented by the application 18 for the purpose of estimating an implied intent of the user 16 (e.g., to access more information related to the alleged new re-financing rates at Central Bank, in the illustrated embodiment).

In addition, in certain embodiments, the anti-phishing software 12 may determine authenticity of the potential phishing-related link 20 based at least in part on other content of the email message 42 containing the potential phishing-related link 20. For example, as illustrated in FIG. 2, the email message 42 is ostensibly from a bank named Central Bank, but the email address 46 of the email message 42 does not appear to be of a legitimate format. In particular, the domain of the email address 46 is "gndfcsk.com" instead of something like "centralbank.org". The anti-phishing software 12 may determine that the link 20 is not authentic based at least in part on the email address 46 appearing to not be of a legitimate format. In addition, as also illustrated in FIG. 2, the subject line 48 of the email message 42, as well as the rest of the content of the email message 42, contain misspellings (e.g., "RE-FINANCNG" and "customrs") and punctuation errors (e.g., no space between "Hello," and "John"). Although errors in email messages 42 are entirely possible, the anti-phishing software 12 may determine that the link 20 is possibly not authentic based at least in part on the presence of misspellings, punctuation errors, grammatical errors, and so forth, within the email message 42. Indeed, in certain embodiments, as the number of such errors increases for a particular email message 42, the anti-phishing software 12 may determine that the likelihood of the link 20 being not authentic also increases. In addition, as illustrated in FIG. 2, the email message 42 is addressed to a person named John. However, if the user 16 is not, in fact, named John (e.g., as determined by the application 18 and/or the anti-phishing software 12 based on user settings thereof), the anti-phishing software 12 may determine that the link 20 is not authentic based at least in part on this fact.

The potential indicators of inauthenticity illustrated in FIG. 2 are merely exemplary and not intended to be limiting. Many other indicators of inauthenticity of the link 20 may be determined by the anti-phishing software 12 in the context of the other content of the email message 42 presented by the application 18. In addition, any combination of indicators of inauthenticity of the link 20 may be used in combination with each other. In certain embodiments, the anti-phishing software 12 may employ artificial intelligence 38 to aid in the analysis of the other content of the email message 42 presented by the application 18 for the purpose of determining whether the link 20 is authentic.

Figure 3:
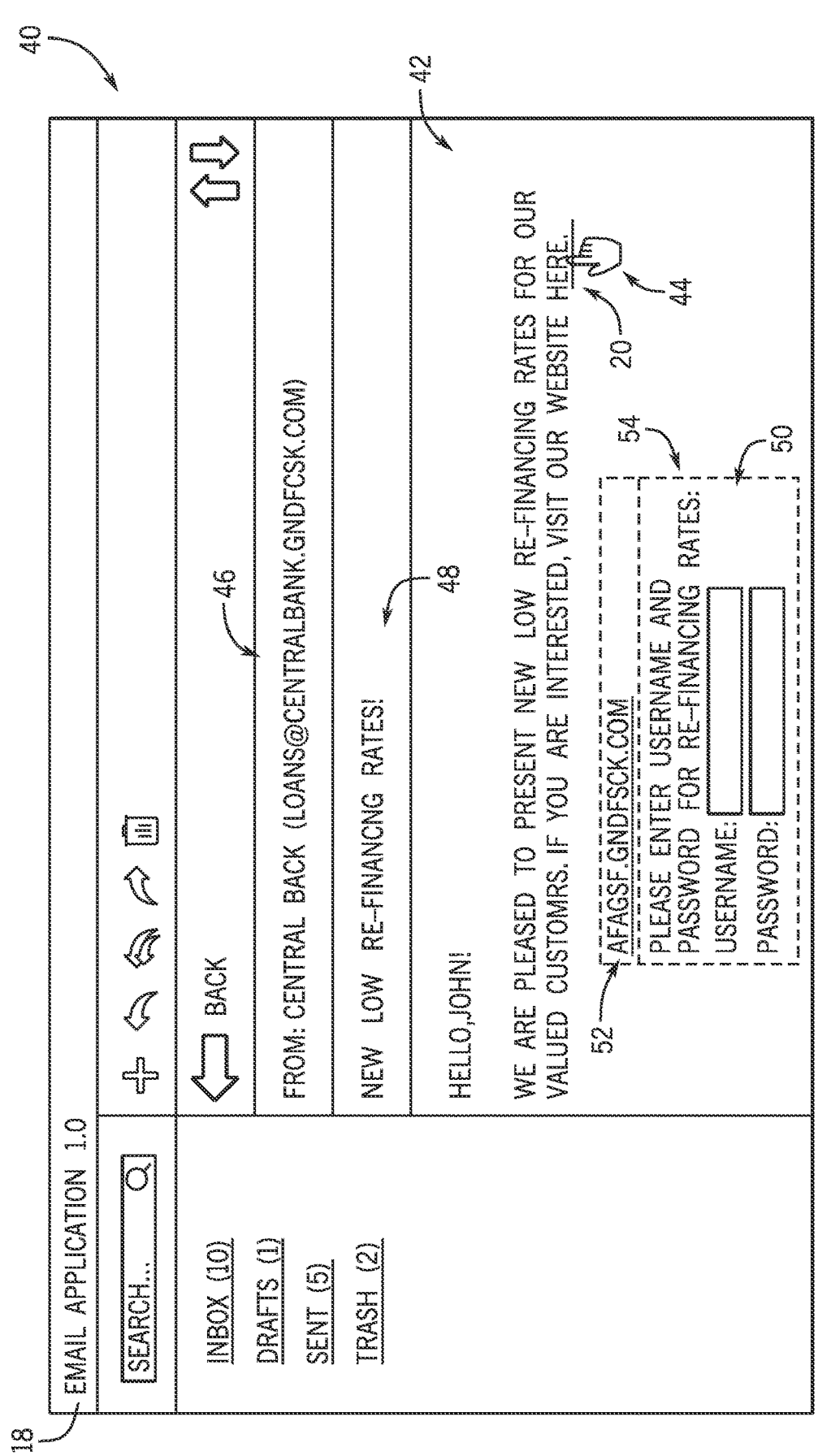
FIG. 3 illustrates content accessed at a location of a potential phishing-related link being in a "sandbox mode" isolated from an application presenting the potential phishing-related link, in accordance with embodiments described herein.

Furthermore, in addition to determining whether a potential phishing-related link 20 is authentic based at least in part on the context of other content associated with the potential phishing-related link 20 that is presented by an application 18 (e.g., to estimate an implied user intent), in certain embodiments, the anti-phishing software 12 may determine authenticity of the potential phishing-related link 20 by accessing content at a location corresponding to the potential phishing-related link 20, for example, in a "sandbox mode" (e.g., isolated from the application 18). For example, as illustrated in FIG. 3, in response to the potential phishing-related link 20 being selected by a user 16, the anti-phishing software 12 may access the content 50 at the location 52 corresponding to the potential phishing-related link 20 in the isolated sandbox mode 54 (e.g., separate from the application 18), and may analyze this accessed content 50 to determine if it matches the estimate implied intent of the user 16 and, therefore, is likely to be authentic. As used herein, the term "sandbox" may refer to an isolated executable space wherein the content has limited, or even no, access to potentially harmful phishing content 50, whereby the isolated content 50 may be examined by the anti-phishing software 12 to determine the authenticity of the isolated content 50.

Although illustrated as being displayed via the graphical user interface 40 of FIG. 3, in certain embodiments, the isolated content 50 may instead be analyzed in the background (e.g., not displayed via the graphical user interface 40). Indeed, the isolated content 50 is illustrated in FIG. 3 to aid the description of the functionality of the anti-phishing software 12. Regardless, the ability of the anti-phishing software 12 to access the content 50 in a sandbox mode separate (and isolated) from the application 18 ensures that any potentially harmful phishing content is not presented to the user 16 via the application 18 until the anti-phishing software 12 determines that the content 50 is likely authentic (and, therefore, likely not harmful).

In the embodiment illustrated in FIG. 3, the isolated content 50 is prompting the user 16 to enter a username and password despite the fact that the estimated implied intent of the user 16 determined by the anti-phishing software 12 is to merely access more information related to the alleged new re-financing rates at Central Bank. In certain embodiments, the anti-phishing software 12 may determine that a username and password should not be necessary in order to merely access more information related to the alleged new re-financing rates at Central Bank. In certain embodiments, the anti-phishing software 12 may employ artificial intelligence 38 to aid in the analysis of the isolated content 50 for the purpose of determining that the isolated content 50 does not match the estimated implied intent of the user 16 and, therefore, is likely not authentic.

Therefore, the anti-phishing software 12 may determine authenticity of a potential phishing-related link 20 based at least in part on an estimated implied intent of a user 16 selecting the potential phishing-related link 20 and/or based at least in part on other content of the application 18 associated with the potential phishing-related link 20. In response to determining automatically authenticity of the potential phishing-related link 20, the anti-phishing software 12 may communicate certain command signals relating to the authenticity of the potential phishing-related link 20 to the application 18 including, but not limited to, a command signal to block the application 18 from accessing the content 50 accessible via the potential phishing-related link 20 in response to determining that the potential phishing-related link 20 is not authentic, a command signal to allow the application 18 to access the content 50 accessible via the potential phishing-related link 20 in response to determining that the potential phishing-related link 20 is authentic, automatically providing identification data (e.g., an identification number, and so forth) relating to the potential phishing-related link 20 in response to determining that the potential phishing-related link 20 is authentic (e.g., which may be used to enable the application 18 to have continued access to the content 50 accessible via the potential phishing-related link 20 without having to repeat the analysis process), and so forth.

Figure 4:
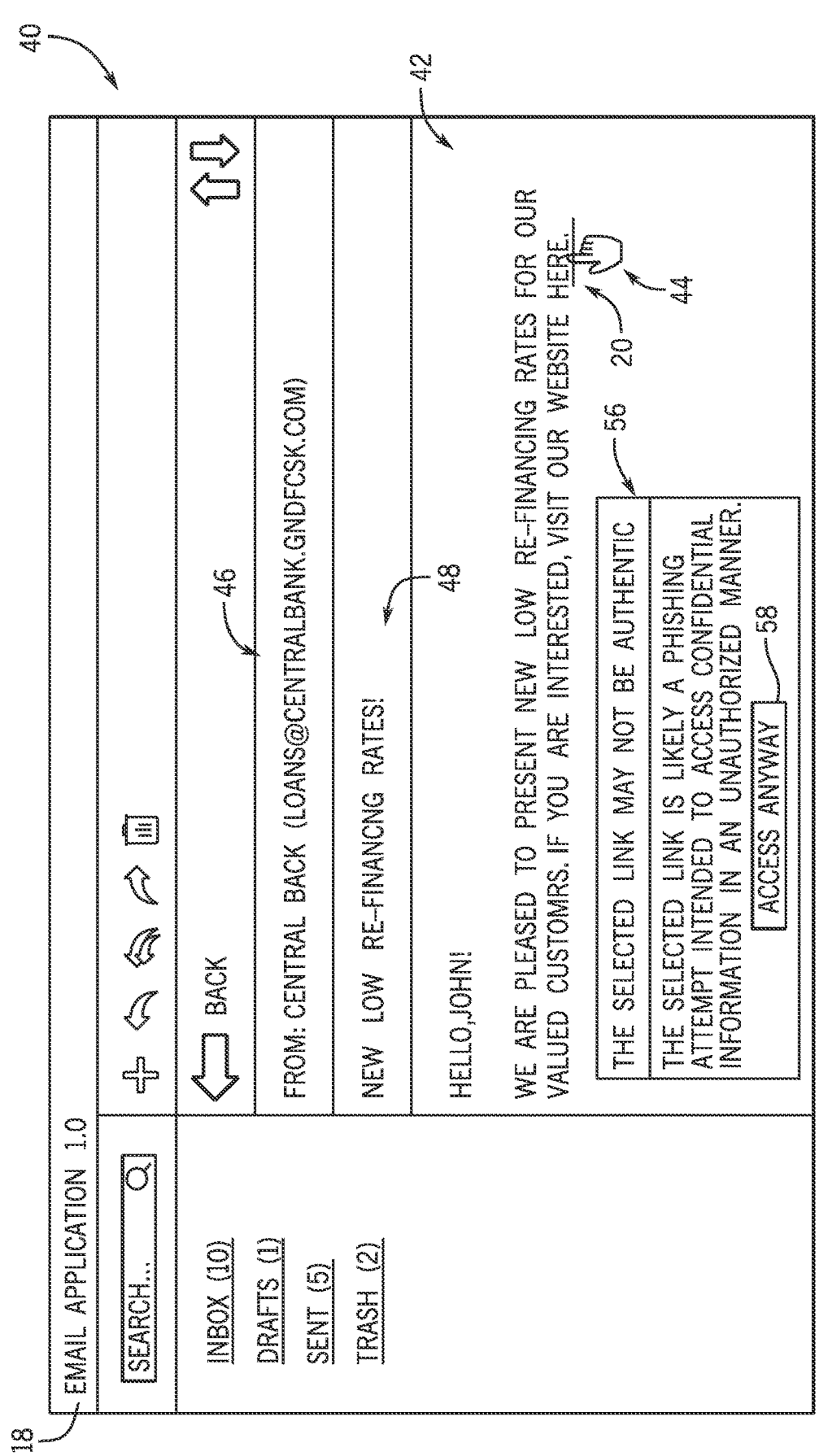
FIG. 4 illustrates an alert being prompted via an application to notify a user that a selected link is likely not authentic, in accordance with embodiments described herein.

In addition, in certain embodiments, in response to determining that the potential phishing-related link 20 is not authentic, the anti-phishing software 12 may prompt an alert 56 via the application 18. For example, as illustrated in FIG. 4, the anti-phishing software 12 may communicate a command signal to the application 18 to provide an alert 56 that the link 20 selected by the user 16 is likely not authentic. In certain embodiments, the application 18 may include an override button 58 with the alert 56 to enable the user 16 to access the content 50 via the link 20 anyway. In addition, in certain embodiments, regardless of the authenticity of the link 20, the anti-phishing software 12 may store information relating to the authenticity of the link 20 (e.g., in cloud storage 34) for the purpose of building a database of authentic and inauthentic links 20 in order to speed the determinations of authenticity of future similar potential phishing-related links 20.

Figure 5:
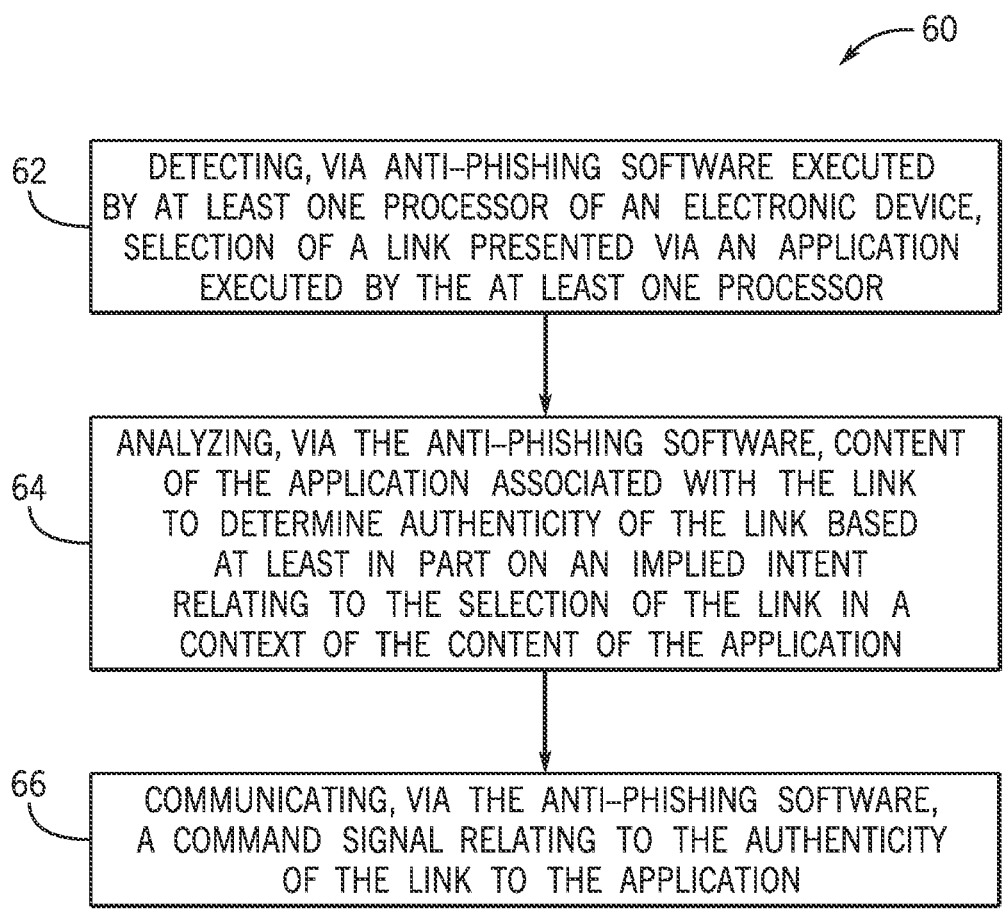
FIG. 5 is a flow diagram of a method of using anti-phishing software, in accordance with embodiments described herein.

FIG. 5 is a flow diagram of a method 60 of using the anti-phishing software 12 described herein. As illustrated in FIG. 5, in certain embodiments, the method 60 includes detecting, via the anti-phishing software 12 executed by at least one processor 22 of an electronic device 14, selection of a link 20 presented via an application 18 executed by the at least one processor 22 (block 62). In addition, in certain embodiments, the method 60 includes analyzing, via the anti-phishing software 12, content of the application 18 associated with the link 20 to determine authenticity of the link 20 based at least in part on an implied intent relating to the selection of the link 20 in a context of the content of the application 18 (block 64). In addition, in certain embodiments, the method 60 includes communicating, via the anti-phishing software 12, a command signal relating to the authenticity of the link 20 to the application 18 (block 66).

In addition, in certain embodiments, the method 60 includes employing, via the anti-phishing software 12, artificial intelligence 38 to analyze the content of the application 18 associated with the link 20 to determine the authenticity of the link 20. In addition, in certain embodiments, the method 60 includes accessing, via the anti-phishing software 12, content 50 at a location 52 corresponding to the link 20 in a sandbox mode isolated from the application 18 to determine the authenticity of the link 20. In addition, in certain embodiments, the method 60 includes blocking, via the anti-phishing software 12, the application 18 from having access to content 50 at a location 52 corresponding to the link 20 in response to determining that the link 20 is not authentic. In addition, in certain embodiments, the method 60 includes prompting, via the anti-phishing software 12, an alert 56 via the application 18 in response to determining that the link 20 is not authentic. In addition, in certain embodiments, the method 60 includes allowing, via the anti-phishing software 12, the application 18 to have access to content 50 at a location 52 corresponding to the link 20 in response to determining that the link 20 is authentic. In addition, in certain embodiments, the method 60 includes communicating, via the anti-phishing software 12, identification data relating to the link 20 in response to determining that the link 20 is authentic. In addition, in certain embodiments, the method 60 includes storing, via the anti-phishing software 12, information relating to the authenticity of the link 20 in cloud storage.

In certain embodiments, the anti-phishing software 12 includes a plug-in control component executed within the application 18. In other embodiments, the anti-phishing software 12 includes a background application executed simultaneously with the application 18 (e.g., separate from, and in parallel with, the application 18). In addition, in certain embodiments, the application 18 includes a web browser application, an email application, a text messaging application, a social media application, or some combination thereof.

In addition, in certain embodiments, a tangible, non-transitory machine-readable medium 26 includes processor-executable instructions 24 that, when executed by at least one processor 22, cause the at least one processor 22 to implement anti-phishing software 12, wherein the anti-phishing software 12 is configured to detect selection of a link 20 presented via an application 18 executed by the at least one processor 22; analyze content of the application 18 associated with the link 20 to determine authenticity of the link 20 based at least in part on an implied intent relating to the selection of the link 20 in a context of the content of the application 18; and communicate a command signal relating to the authenticity of the link 20 to the application 18.

In certain embodiments, the anti-phishing software 12 is configured to employ artificial intelligence 38 to analyze the content of the application 18 associated with the link 20 to determine the authenticity of the link 20. In addition, in certain embodiments, the anti-phishing software 12 is configured to access content 50 at a location 52 corresponding to the link 20 in a sandbox mode isolated from the application 18 to determine the authenticity of the link 20. In addition, in certain embodiments, the anti-phishing software 12 is configured to block the application 18 from having access to content 50 at a location 52 corresponding to the link 20 in response to determining that the link 20 is not authentic. In addition, in certain embodiments, the anti-phishing software 12 is configured to prompt an alert 56 via the application 18 in response to determining that the link 20 is not authentic. In addition, in certain embodiments, the anti-phishing software 12 is configured to allow the application 18 to have access to content 50 at a location 52 corresponding to the link 20 in response to determining that the link 20 is authentic. In addition, in certain embodiments, the anti-phishing software 12 is configured to communicate identification data relating to the link 20 in response to determining that the link 20 is authentic. In addition, in certain embodiments, the anti-phishing software 12 is configured to store information relating to the authenticity of the link 20 in cloud storage.

In certain embodiments, the anti-phishing software 12 includes a plug-in control component executed within the application 18. In other embodiments, the anti-phishing software 12 includes a background application executed simultaneously with the application 18 (e.g., separate from, and in parallel with, the application 18). In addition, in certain embodiments, the application 18 includes a web browser application, an email application, a text messaging application, a social media application, or some combination thereof.

In addition, in certain embodiments, an anti-phishing system 10 is configured to detect, via anti-phishing software 12 executed by at least one processor 22 of an electronic device 14, selection of a link 20 presented via an application 18 executed by the at least one processor 22; to analyze, via the anti-phishing software 12, content of the application 18 associated with the link 20 to determine authenticity of the link 20 based at least in part on an implied intent relating to the selection of the link 20 in a context of the content of the application 18; and to communicate, via the anti-phishing software 12, a command signal relating to the authenticity of the link 20 to the application 18.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method, comprising:
    detecting, via anti-phishing software executed by at least one processor of an electronic device, selection by a user of a link presented via an application executed by the at least one processor;
    accessing, via the anti-phishing software, link-related content at a location corresponding to the link in a sandbox mode isolated from the application;
    employing, via the anti-phishing software, artificial intelligence to:
        determine an implied intent of the user relating to the selection of the link in a context of application-related content presented via the application relative to the link, wherein the application-related content comprises one or more potential indicators of inauthenticity; and
        determine authenticity of the link based at least in part on the link-related content, the one or more potential indicators of inauthenticity in the application-related content, and the implied intent; and
    communicating, via the anti-phishing software, a command signal relating to the authenticity of the link to the application.

2. The method of claim 1, comprising blocking, via the anti-phishing software, the application from having access to the link-related content at the location corresponding to the link in response to determining that the link is not authentic.

3. The method of claim 1, comprising allowing, via the anti-phishing software, the application to have access to the link-related content at the location corresponding to the link in response to determining that the link is authentic.

4. The method of claim 1, comprising communicating, via the anti-phishing software, identification data relating to the link in response to determining that the link is authentic.

5. The method of claim 1, comprising storing, via the anti-phishing software, information relating to the authenticity of the link in a cloud-based database of authentic and inauthentic links.

6. The method of claim 1, wherein the anti-phishing software comprises a plug-in control component executed within the application.

7. The method of claim 1, wherein the anti-phishing software comprises a background application executed simultaneously with the application.

8. A tangible, non-transitory machine-readable medium, comprising processor-executable instructions that, when executed by at least one processor, cause the at least one processor to implement anti-phishing software, wherein the anti-phishing software is configured to:
    detect selection by a user of a link presented via an application executed by the at least one processor;
    access link-related content at a location corresponding to the link in a sandbox mode isolated from the application;
    employ artificial intelligence to:
        determine an implied intent of the user relating to the selection of the link in a context of application-related content presented via the application relative to the link, wherein the application-related content comprises one or more potential indicators of inauthenticity; and
        determine authenticity of the link based at least in part on the link-related content, the one or more potential indicators of inauthenticity in the application-related content, and the implied intent; and
    communicate a command signal relating to the authenticity of the link to the application.

9. The machine-readable medium of claim 8, wherein the anti-phishing software is configured to block the application from having access to the link-related content at the location corresponding to the link in response to determining that the link is not authentic.

10. The machine-readable medium of claim 8, wherein the anti-phishing software is configured to allow the application to have access to the link-related content at the location corresponding to the link in response to determining that the link is authentic.

11. The machine-readable medium of claim 8, wherein the anti-phishing software is configured to communicate identification data relating to the link in response to determining that the link is authentic.

12. The machine-readable medium of claim 8, wherein the anti-phishing software is configured to store information relating to the authenticity of the link in a cloud-based database of authentic and inauthentic links.

13. The machine-readable medium of claim 8, wherein the anti-phishing software comprises a plug-in control component executed within the application.

14. The machine-readable medium of claim 8, wherein the anti-phishing software comprises a background application executed simultaneously with the application.

15. The machine-readable medium of claim 8, wherein the application comprises a web browser application, an email application, a text messaging application, a social media application, or some combination thereof.

16. An anti-phishing system comprising a memory and at least one processor configured to:
    detect, via anti-phishing software executed by the at least one processor of an electronic device, selection by a user of a link presented via an application executed by the at least one processor;
    access, via the anti-phishing software, link-related content at a location corresponding to the link in a sandbox mode isolated from the application;
    employ, via the anti-phishing software, artificial intelligence to:
        determine an implied intent of the user relating to the selection of the link in a context of application-related content presented via the application relative to the link, wherein the application-related content comprises one or more potential indicators of inauthenticity; and determine authenticity of the link based at least in part on the link-related content, the one or more potential indicators of inauthenticity in the application-related content, and the implied intent;

communicate, via the anti-phishing software, a command signal relating to the authenticity of the link to the application; and block, via the anti-phishing software, the application from having access to the link-related content at the location corresponding to the link in response to determining that the link is not authentic.

\* \* \* \* \*